Figure 1:
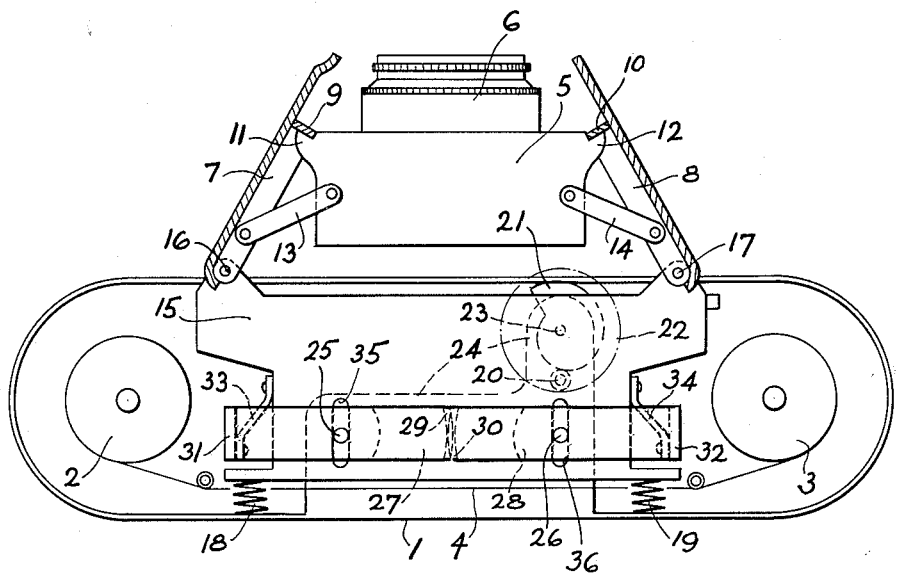

Dec. 13, 1955  F. FAULHABER  2,726,585
ADJUSTING DEVICE FOR THE OBJECTIVE
OF PHOTOGRAPHIC CAMERAS
Filed May 2, 1951  2 Sheets-Sheet 1

INVENTOR.
FRITZ FAULHABER
BY Mock & Blum
ATTORNEYS

Dec. 13, 1955   F. FAULHABER   2,726,585
ADJUSTING DEVICE FOR THE OBJECTIVE
OF PHOTOGRAPHIC CAMERAS

Filed May 2, 1951   2 Sheets-Sheet 2

*INVENTOR.*
FRITZ FAULHABER
BY Mock + Blum
ATTORNEYS

United States Patent Office 2,726,585
Patented Dec. 13, 1955

2,726,585

ADJUSTING DEVICE FOR THE OBJECTIVE OF PHOTOGRAPHIC CAMERAS

Fritz Faulhaber, Schonthal, Germany, assignor to Voigtlander & Sohn Aktiengesellschaft, Braunschweig, Germany, a corporation of Germany Application May 2, 1951, Serial No. 224,106

Claims priority, application Switzerland May 4, 1950

4 Claims. (Cl. 95—45)

This invention relates to a device for sharp focusing of the objective in photographic cameras by means of an actuating member built into the camera.

In devices of this type, it has been previously suggested to displace the objective together with the complete system of struts or spreaders, relative to the camera body or the stationary base-board of the camera, particularly in cameras, in which the focusing mount of the objective is mechanically coupled with the rangefinder.

The invention is not limited to cameras having a built-in rangefinder and can be applied to cameras provided with any type of focusing means.

It is contemplated according to the present invention to provide a focusing device which meets the requirement of securing a rectilinear, parallel displacement of the objective board, even in cameras having no base-board. This is attained according to the present invention by the arrangement in the camera casing of a frame-like or box-like carrier of spreaders, which is characterized by high specific rigidity and serves as a particular displacing member, and is displaced by an eccentric or the like, in a completely parallel movement, in spite of unilateral engagement. This, however, is based on the assumption that the spreader box carries and holds the objective board by means of spreaders safely and immovably in its spreaded position.

Such spreader arrangements have been suggested previously. A particularly efficient arrangement or system of this type has been described in my copending patent application for "Strut or Spreader System for Photographic Cameras," filed under Serial Number 224,103 on May 2, 1951, now Patent No. 2,637,254.

In cameras provided with a base board, the obtaining and securing of a parallel displacement of the beforementioned aggregate of objective and spreader system, caused no particular difficulty. However, there is no such supporting element in cameras provided with bellows and having no base board and, therefore, the strong, rigid spreader box of the present invention, plays a decisive role in obtaining parallel advance of said aggregate in such cameras.

Owing to the indispensable necessity of unobstructed passage of light, the drive cannot be applied to the centre and must be arranged on the sides or on one side only, and the means hitherto known in the art of photographic cameras, and not adapted to solve this problem. In modern cameras provided with a coupled range finder, it is likewise necessary in most cases to arrange the drive on one side, in order to avoid complicated transmission gears, and such unilateral arrangement adversely effects paralellism of displacement.

These difficulties can be overcome by the present invention. The latter provides for a gear system which transmits the feed drive in a completely equal manner to the other side of the spreader box. Uniformity of this transmission is secured by members of the gear system, which are in engagement with each other. According to a preferred embodiment of the invention, swinging levers are arranged on both sides of the spreader box and these levers are provided with meshing toothed segments. The levers are pivoted in the camera casing. As no great forces are transmitted, there is no danger, of an adverse effect on the exactness of transmission, by wear of the toothed elements.

The device according to the invention is characterized by a number of further structural and functional features, which act in combination with the beforementioned features, in securing a completely parallel displacement.

It is essential in the device according to the invention that the spreader carrier should react easily and without delay, whenever a displacement or adjustment is carried out. Therefore, the spreader carrier must be always ready for being moved without jamming. In order to secure such mobility, and also in order to attain a positive contact with the displaceable organ of the adjusting mechanism, according to the invention the bottom part of the spreader carrier, which is turned toward the camera wall, or the transmission system positively connected with the spreader box or carrier, is elastically propped at the camera wall, for example by the use of compression springs at its four corners. Such compression springs can be adjusted without difficulty in such manner that a parallel movement of the spreaders is secured. If desired, in addition to the above, soft-guiding bolts can be arranged on the camera, which are not clamped by springs. As mentioned above, the compression springs cause the spreader box to bear constantly against the eccentric of the rangefinder.

A contact member, preferably a roller, is arranged at the spreader box or in connection with the above mentioned transmission members, which bears against the surface of an eccentric serving as an adjusting member.

The other ends of the levers provided with toothed elements at one of their ends, are bent in the shape of a stirrup and are elastically connected to a certain extent by means of the transverse webs thus formed with the spreader box. The use of leaf springs, which are riveted at one end to the lever ends and at the other end riveted to the spreader box, has been found to be particularly advantageous.

The rectilinear movement of the spreader box can be further secured against tilting and jamming by guiding the spreader box by means of elongated slots provided therein and stationary bolts or the like, fastened to the camera casing. Such arrangement particularly prevents also lateral displacement. This arrangement which is conventional for other purposes in the construction of photographic cameras, can be utilized with particular advantage in connection with the present invention by correspondingly lengthening the beforementioned pivots of the swinging levers provided with toothed segments and using them as guide elements.

The present invention has particular advantages in its application to photographic cameras, in which adjustment of a rangefinder built into the camera, is mechanically coupled with adjustment of the objective. According to the invention, the spreader box which is firmly connected with the objective in active position of the latter, and can be subjected to parallel displacement by the above described transmission mechanism, is coupled with the drive of the rangefinder. In other words, and with reference to the purely diagrammatical illustration in Figure 5, this means the following: The adjusting mechanism 501, the spreader box and the optical means 502 firmly connected with it, and finally the rangefinder 503 are connected in a sequence in series. This chain or system proved to be particularly efficient and appropriate and has the advantage that damage to a single member of the system indicates at once the necessity of repair. This is different in some often used conventional chains or systems, in which upon displacement of one of the members, the two other members are simultaneously displaced, in direct dependence on said one of the members. In such systems there is no indication if one of the members, for example the rangefinder, is not adjusted at all, except in cases in which the adjusting member is mechanically stopped.

Figure 4:
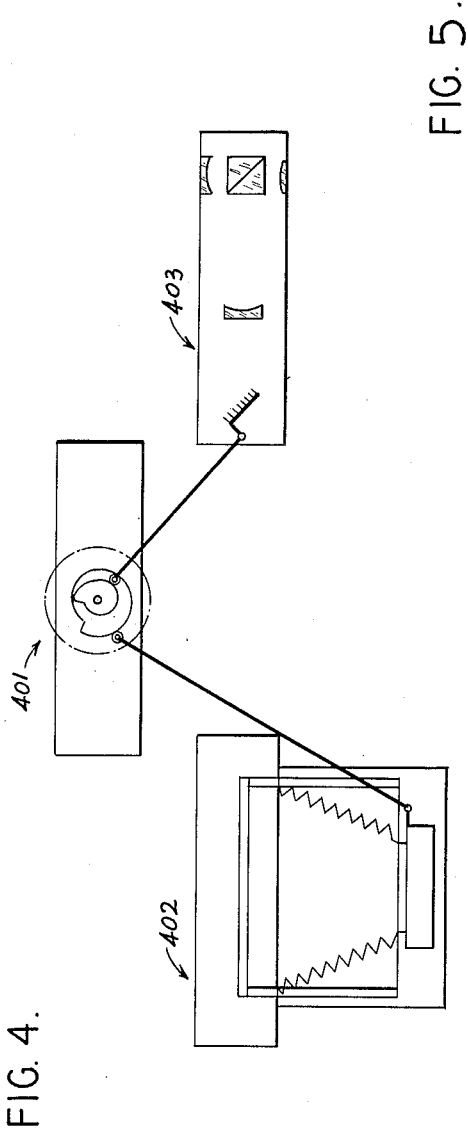

Explanatory Figure 4 purely diagrammatically illustrates one example of the possible embodiments of such parallel connection. Other embodiments show fundamentally similar differences in comparison to the system illustrated in Figure 5, which is the preferred embodiment contemplated by the present invention. However, it is to be understood that the present invention per se, can be applied also in systems different from that shown in Figure 5, for example in a system corresponding to Figure 4, without the necessity of essential changes in carrying out the invention. In Figure 4, the adjusting mechanism is denoted 401. With reference to the connection in parallel, two eccentrics, which are arranged in superposition and operated by the same driving knob, are indicated in Figure 4. One of the eccentrics controls adjustment 402 of the objective, if desired, together with the spreader system. The other eccentric controls adjustment 403 of the rangefinder.

The appended drawings, illustrate, by way of example, an embodiment of the invention, to which the invention is not limited.

Figure 2:
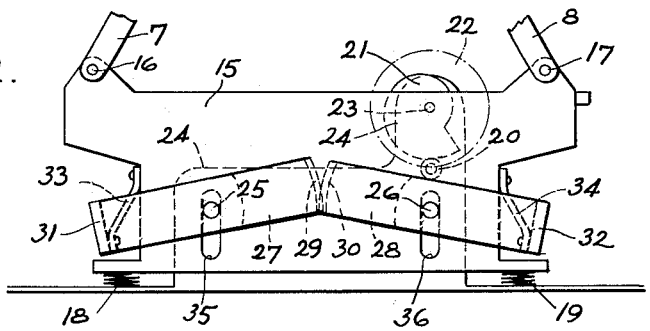
Figure 3:
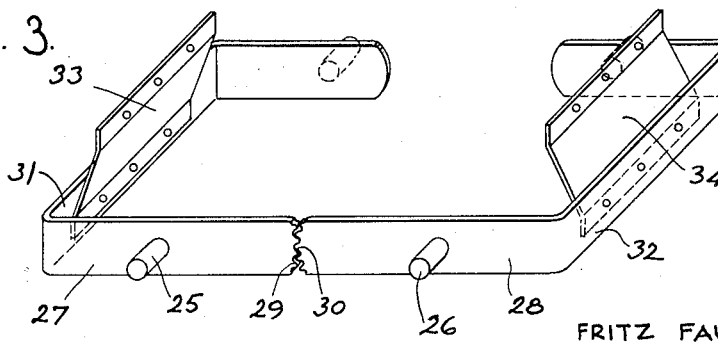
Figure 5:
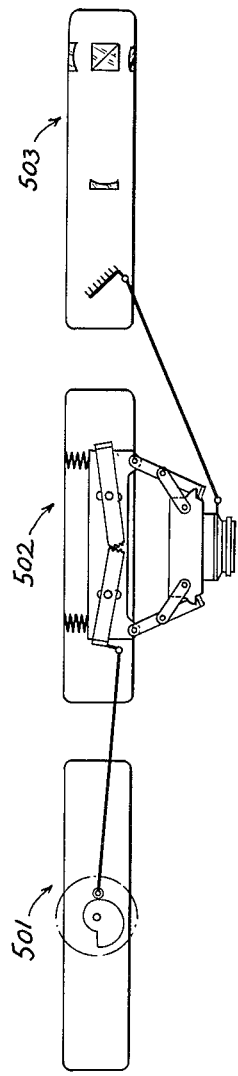

Figure 1 is a bottom view of said embodiment in diagrammatical illustration; Figure 2 diagrammatically illustrates the same embodiment in another position; Figure 3 illustrates the transmission gear, in perspective view at an enlarged scale; Figures 4 and 5 have been described above: while Figure 4 diagrammatically illustrates a conventional parallel connection of the system of an adjusting device for photographic cameras, Figure 5 illustrates a connection in series of the members of such system.

In the drawing, 1 denotes the camera casing, 2 and 3 are the conventional film spools, and 4 is the image plane. 5 denotes the objective board in advanced position and 6 is the photographic objective in the position ready for taking pictures. 7 and 8 are struts or spreaders, which form simultaneously a two-part cover for the camera. By means of their projections 9 and 10, these spreaders 7 and 8 hold objective board 5, projections 11 and 12 of which are pressed against elements 9 and 10. Objective board 5 is movably connected, by means of steering levers 13, 14, to cover spreaders 7 and 8.

15 denotes the spreader box or frame, by which objective carrier 5 is received in rest position of the latter. Spreaders 7 and 8 are pivotally linked by pivots 16, 17, respectively, to the spreader box. At its four corners, spreader box 15 is supported by spirally wound compression springs denoted by reference numerals 18, 19, in the drawing. A rotatable, stationary roller 20 which is fastened to spreader box 15, bears, owing to the effect of springs 18, 19, constantly against eccentric 21, which is actuated by means of a rotary knob 22 or the like, shown in dash-and-dot line in the drawing, when the rangefinder is adjusted.

Eccentric 21 is carried by stationary shaft 23 fastened to camera casing 1. This is indicated in the drawing by element 24, a greater part of which is shown in dotted line. When eccentric 21 is adjusted, from wheel 22, it causes displacement of roll 20 bearing against the eccentric. Such a changed position is illustrated in Figure 2. As the roller 20 is firmly connected with spreader box 15, the latter is likewise displaced. But owing to unilateral strain, the spreader would be tilted; for example, in a motion of the spreader box toward the interior of the camera, i. e. in a downward motion when viewed in the drawing, the left part of the box, viewed in the drawing, would tend to remain in the position shown in Figure 1. Therefore, care must be taken in order to force this left part of the spreader box to uniformly move along during the above mentioned displacement. This is brought about according to the invention in the following manner:

Levers 27 and 28 are rotatably arranged on bolts 25 and 26, which are fastened to the camera casing. Said levers are provided with meshing toothed portions 29 and 30. Levers 27 and 28 have a stirrup-like shape at 31 and 32 (see Figure 3) and leaf springs 33 and 34 are riveted to parts 31 and 32. The other end of leaf springs 33, 34 is riveted to the wall of spreader box 15. As the latter is only elastically connected, over said toothed segments 29, 30, by means of leaf springs 33, 34, with camera body 1, guide means must be provided in order to avoid a lateral deflection between spreader box 15 and camera body 1. This means consists of a bolt or the like, which is fastened to the camera body and is guided in an elongated slot provided in spreader box 15. Bolts 25 and 26 of transmission levers 27 and 28, which project through slots 35 and 36, can be used for this purpose.

The construction shown in Figures 1–3 is operated as follows.

In adjusting the rangefinder built into the camera and coupled with the objective mount, by means of rotary knob 22, eccentric 21 is moved or shifted and thereby roll 20, which is firmly connected to the spreader box and is pressed against eccentric 21 by the impulse of springs 18, 19, is displaced. This displacement of spreader box 15 is transmitted by spring 34 to lever 28, which is then caused to turn around stationary bolt or the like 26, fastened to camera body 1. Owing to the action of toothed segments 29, 30, this movement of lever 28 causes positively an exactly equal displacement of lever 27, which turns around stationary pivot 25. Leaf spring 33 fastened to the stirrup of lever 27, causes displacement of the left part of the spreader box, uniformly with the right part thereof in the drawing. The guiding effect of elongated slot 35 on lengthened bolt 26 additionally provides in connection with this displacement, which is uniform on both sides, for completely parallel movement.

It will be understood that the present invention is not limited to the specific elements, designs, steps and other specific details described above and illustrated in the drawings and can be carried out with various modifications without departing from the scope of the invention as defined in the appended claims.

The terms "frame-like carrier" and "frame-like carrier for the spreader system" are used in the present specification and claims for denoting the carrier element shown in Figure 3 of the appended drawings.

What is claimed is:

1. In an adjusting device for focusing the objective of a photographic camera, in combination, a displaceable unit comprising an objective, a carrier for said objective, a spreader system for said carrier, steering levers movably connecting the spreader system to the carrier, a box-like carrier for the spreader system and movably connected therewith, means for retaining the elements of the unit in an open fixed relationship, stationary bolt elements fastened to the camera for guiding the box-like carrier substantially in the direction of the optical axis of the camera, said box-like carrier having slots receiving the bolt elements, two symmetrically arranged double-armed levers of stirrup-like shape rotatably arranged at their arms on the bolt elements and having their open ends adjoining and provided with positively engaging means for coordinating the curvilinear movement of the two levers, said levers having oppositely disposed web ends, leaf springs connecting the oppositely disposed ends to the corresponding opposite sides of the box-like carrier, said leaf springs being axially disposed substantially in the direction of the optical axis of the camera and being rigid in the axial direction to transmit movement from the levers to the box-like carrier while being resilient to accommodate the curvilinear movement of the levers and rotatable adjusting means built into the camera for engaging one side and causing displacement of the box-like carrier and the displaceable unit, said displacement of the box-like carrier being transmitted over one of the leaf springs to one of the double armed levers, the movement of which causes positively an equal displacement of the other lever which is connected by the other leaf spring to the other side of the box-like carrier, whereby a uniform and completely parallel movement of the box-like carrier and the unit is obtained.

2. A device as claimed in claim 1, in which each of the double armed levers forms half of a frame-like member enclosing the box-like carrier and is journalled outside said box-like carrier on said bolts.

3. A device as claimed in claim 2, in which the rotatable adjusting means engages the box-like carrier under the effect of springs arranged between the box-like carrier and the camera casing.

4. An adjusting device for focusing the objective of a photographic camera comprising, rotatable adjusting means including two double armed levers disposed in end to end relationship and engaging each other by interengaging toothed portions on their inner ends, said levers being movable curvilinearly for displacing, in the direction of the optical axis of the camera, a displaceable unit which consists of an objective, an objective carrier, a spreader system and a box-like carrier, means movably connecting such elements of the unit together, means for retaining said elements in an open position, said box-like carrier having slots which extend substantially in the direction of the optical axis, stationary bolts fastened to the camera and received in the slots for guiding the box-like carrier, said bolts serving also as pivots for the double-armed levers which define an open frame enclosing the box-like carrier, leaf springs connecting the outer ends of the levers to opposite sides of the box-like carrier, said springs extending axially substantially in the direction of the optical axis and each being fastened at one end to the outer end of one of the double-armed levers and at the other end to the corresponding side of the box-like carrier, said leaf springs being rigid in the axial direction to transmit movement between the levers and the box-like carrier in the direction of the optical axis of the camera while being resilient in a direction normal to such axis to accommodate the curvilinear movement of the levers.

References Cited in the file of this patent

UNITED STATES PATENTS

| 989,784 | Kaemmerer | Apr. 18, 1911 |
| 2,026,677 | Goldhammer | Jan. 7, 1936 |
| 2,153,132 | Crowther | Apr. 4, 1939 |

FOREIGN PATENTS

| 326,441 | France | Feb. 21, 1903 |